Sept. 21, 1954

J. MARTIN 2,689,439

COTTON HARVESTER

Filed May 10, 1950

Jesse Martin
INVENTOR

BY CA Snow &Co.
ATTORNEYS.

Sept. 21, 1954

J. MARTIN 2,689,439

COTTON HARVESTER

Filed May 10, 1950

Jesse Martin
INVENTOR

BY C.A.Snow&Co.
ATTORNEYS.

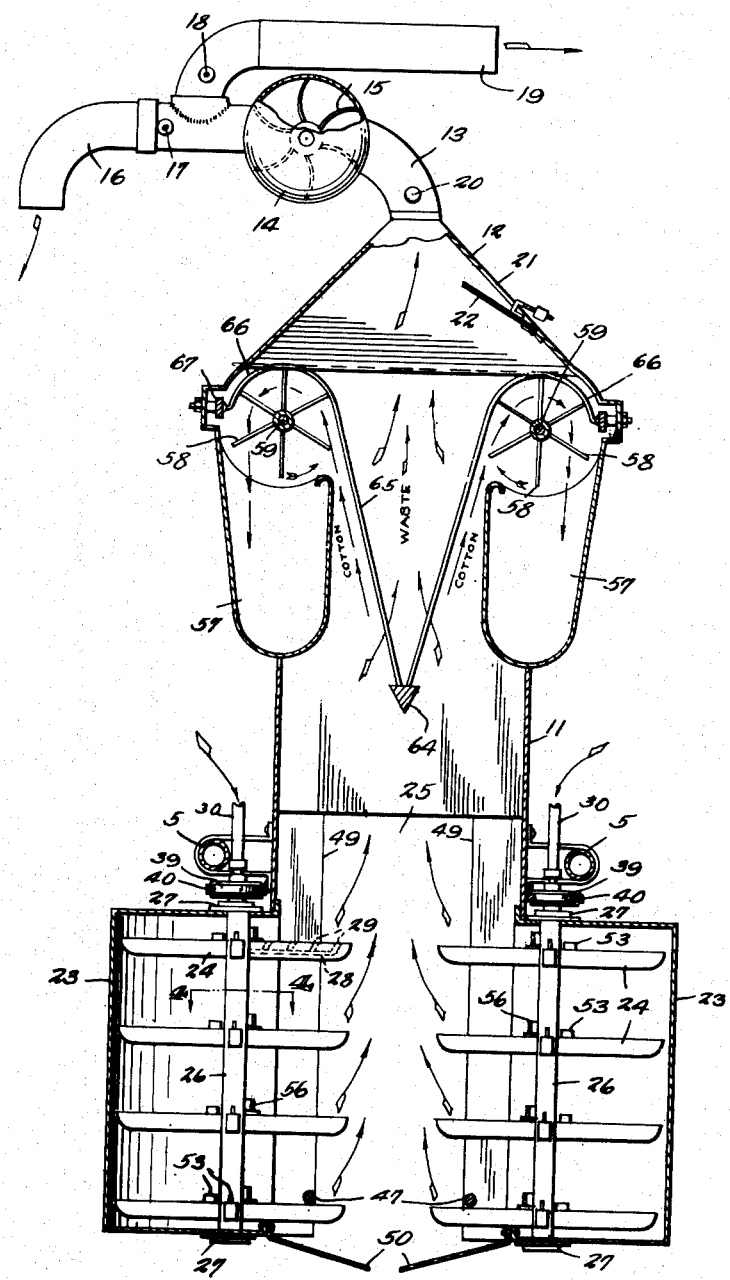

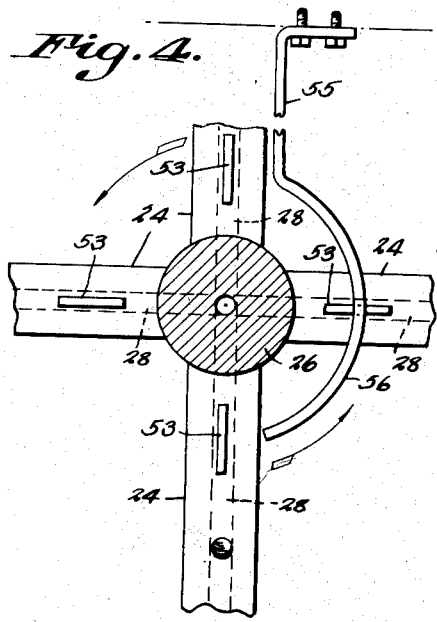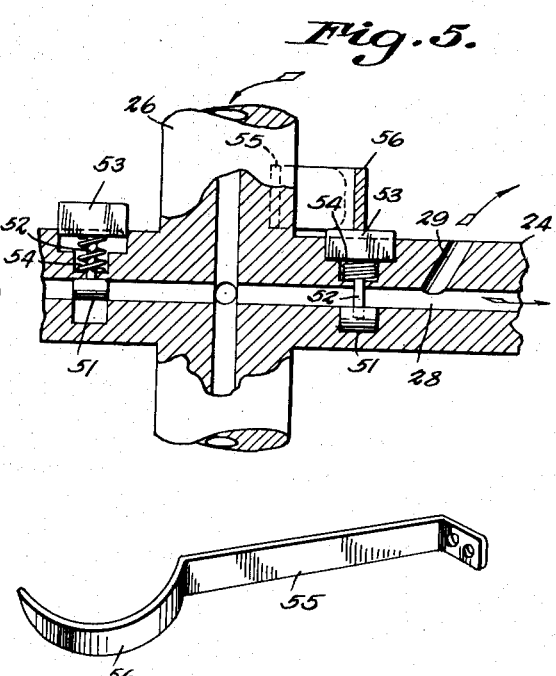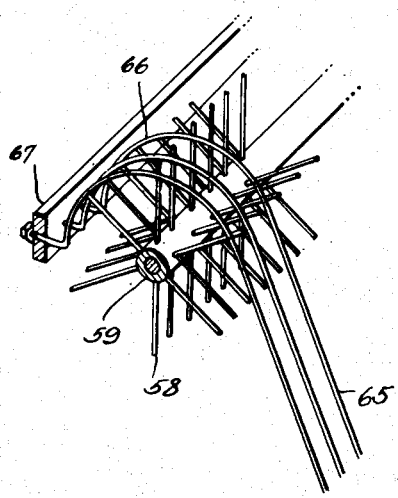

Sept. 21, 1954  J. MARTIN  2,689,439
COTTON HARVESTER
Filed May 10, 1950 5 Sheets-Sheet 5
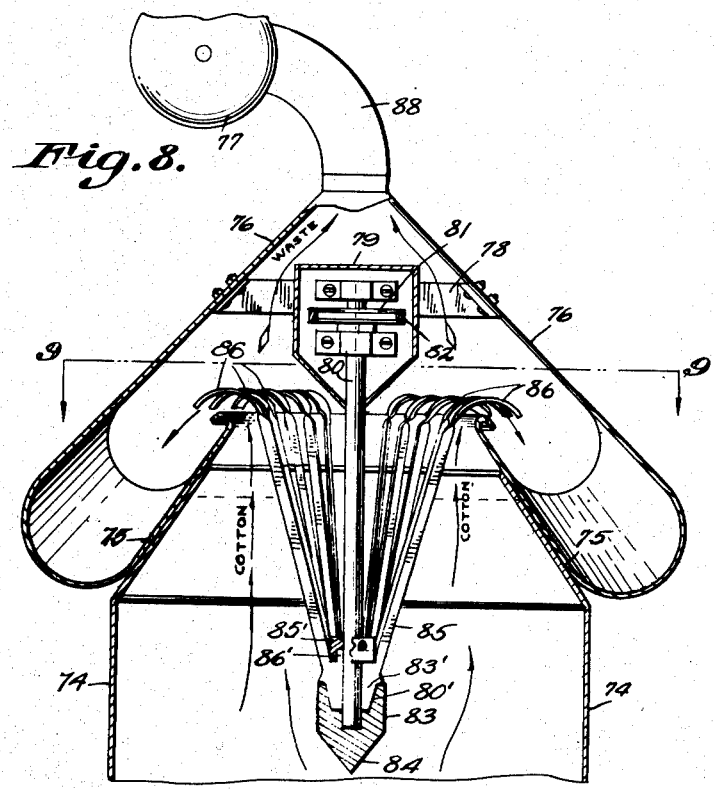
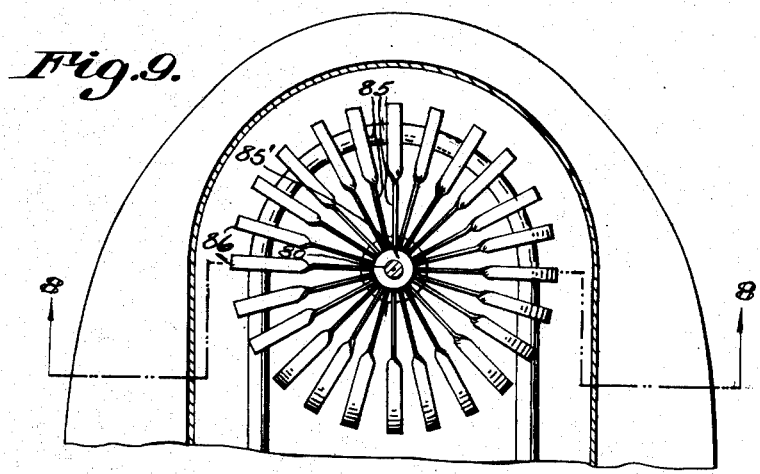
Jesse Martin
INVENTOR
BY C.A.Snow&Co.
ATTORNEYS.

Patented Sept. 21, 1954

2,689,439

UNITED STATES PATENT OFFICE 2,689,439

COTTON HARVESTER

Jesse Martin, Corpus Christi, Tex.; Fay Roots Martin, administratrix of said Jesse Martin, deceased, assignor of one-half to J. B. Linker, Akron, Colo.

Application May 10, 1950, Serial No. 161,173

5 Claims. (Cl. 56—12)

This invention relates to cotton harvesters, and particularly to cotton harvesters of the pneumatic type wherein the cotton is blown from the burrs by revolving air jets directed to the lower sides of the cotton filled burrs.

An important object of the invention is to provide means for automatically cutting off the air supply to the nozzles of the harvester, at predetermined intervals, to the end that the air blast from the nozzles will be directed to the cotton in the burrs, only at the time air jets are passing through the stalk or plant compartment of the harvester, thereby conserving air pressure, and at the same time creating a suction which will draw particles of cotton which may have passed into the nozzle housings.

Another object of the invention is the provision of means for separating the cottom from waste material which may be picked up by the harvester as it moves along the rows of cotton, thereby delivering cotton from the machine which has been thoroughly cleaned of such foreign matter.

A still further object of the invention is to provide means for substantially closing the space at the bottom of the plant or cotton compartment of the machine, thereby confining the action of the air blast from the revolving nozzles to a protected area above the ground surface to prevent dirt and other foreign material from being carried into the machine with the cotton.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Fig. 3 is a longitudinal sectional view through the machine, taken on line 3—3 of Fig. 1.

Fig. 4 is a fragmental plan view illustrating the suction nozzles and valve actuating means thereof.

Fig. 5 is a fragmentary elevational view of the nozzle shaft and nozzles with parts broken away and shown in section.

Fig. 6 is an enlarged perspective view of a stationary valve actuating cam.

Fig. 7 is an enlarged fragmentary perspective view, illustrating the means for separating the cotton from the foreign or waste material.

Fig. 8 is a vertical sectional view through the upper portion of one of the housings of the harvester, illustrating a modified form of separating means.

Fig. 9 is a sectional view taken on line 9—9 of Fig. 8.

Figure 1:
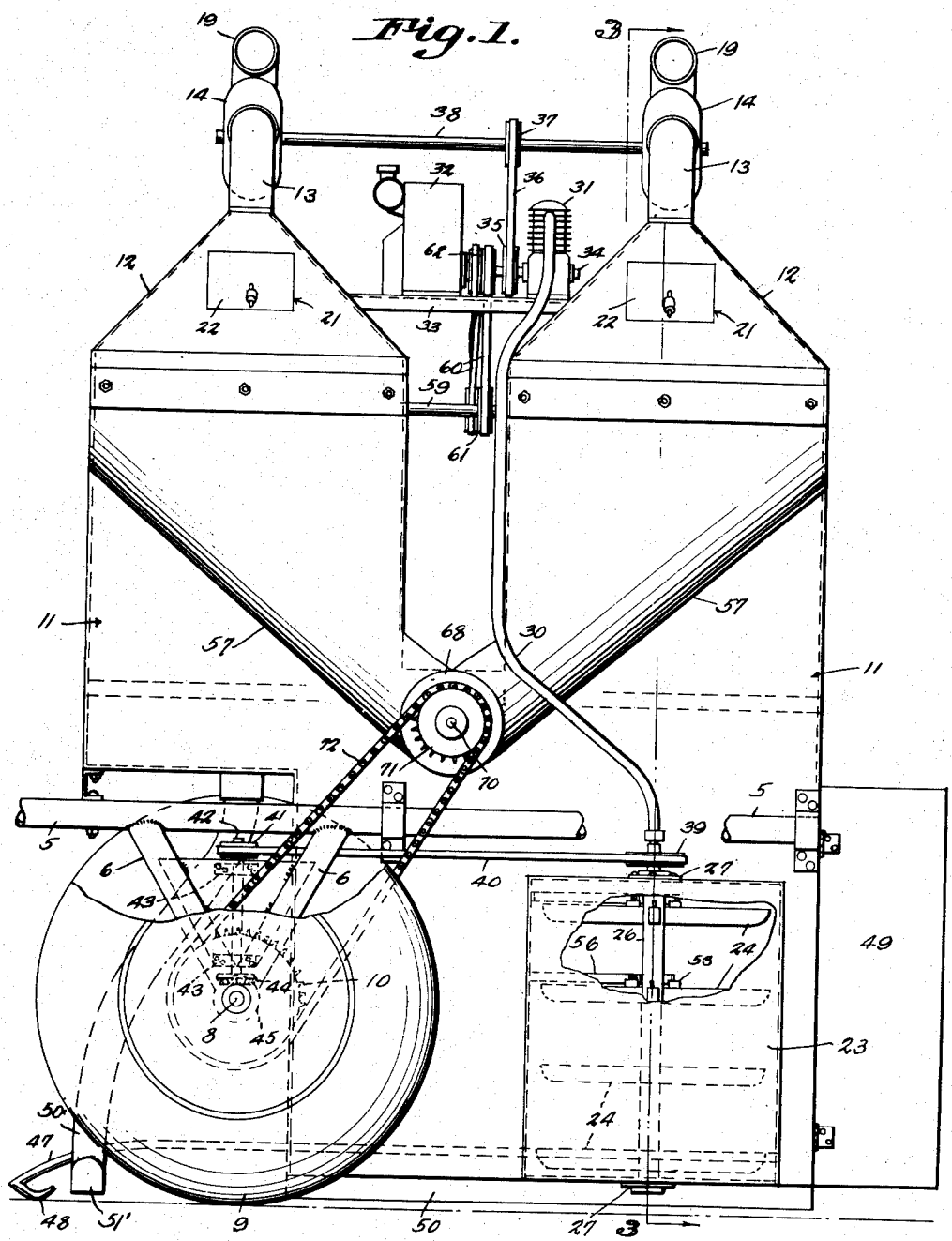
Figure 1 is a side elevational view with parts broken away of a cotton harvesting machine, constructed in accordance with the invention.
Figure 2:
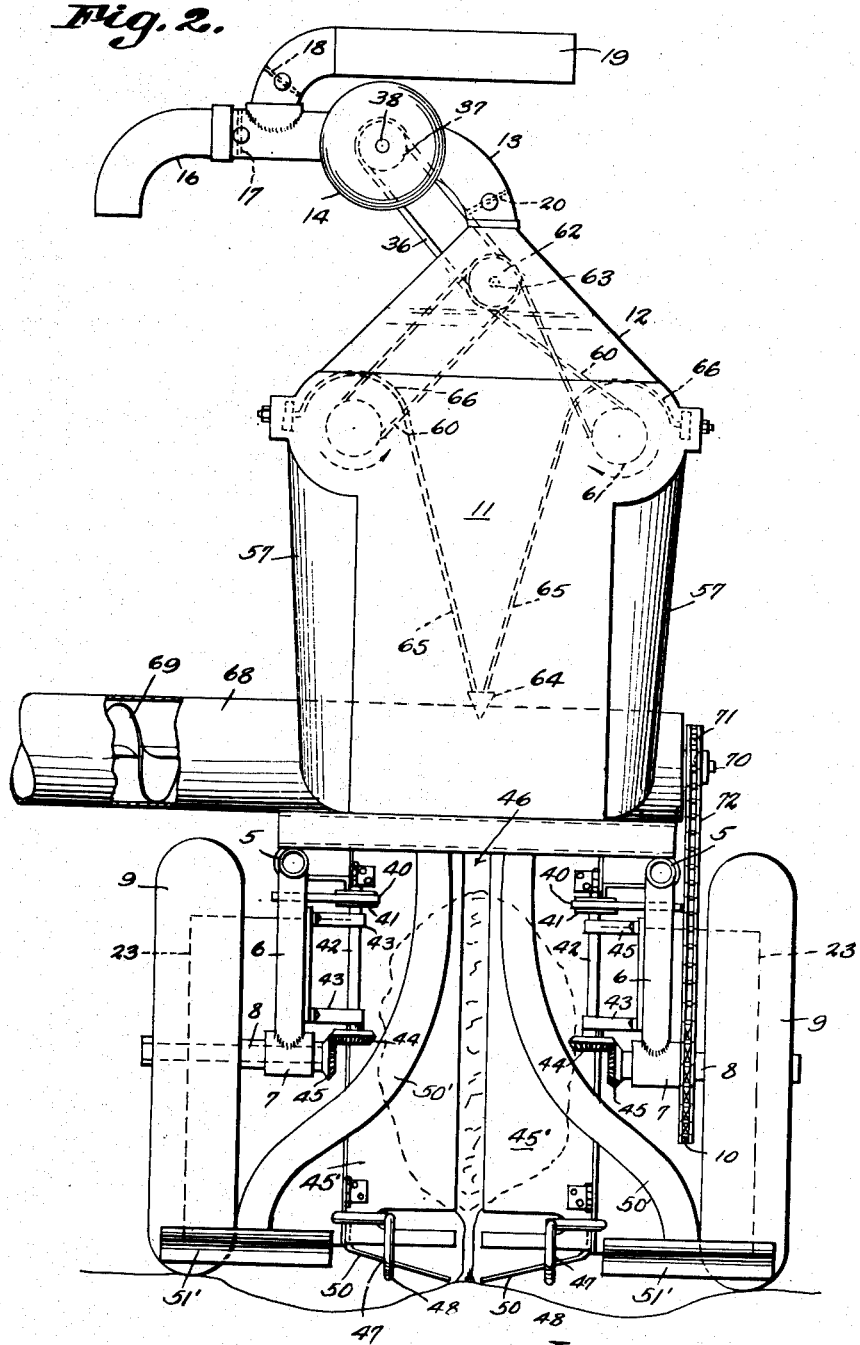
Fig. 2 is a front elevational view thereof.

Referring to the drawings in detail, the harvester comprises a wheel-supported frame, embodying horizontal bars 5 to which the arms 6 are welded, the arms 6 converging towards the lower ends thereof, where they connect with the bearings 7 in which the axles 8 are mounted, the axles providing supports for the wheels 9.

Secured to the axle 8 at one side of the machine, is the sprocket 10 which rotates with the shaft that in turn is secured to the wheel 9 associated therewith, to rotate said axle. Mounted between the bars 5, is the body portion of the harvester which is indicated by the reference character 11, the body portion being substantially rectangular in formation, and comprises closed sides with an inverted tunnel-shaped top 12, to which the pipe 13 is connected, the pipe 13 communicating with the suction fan housing 14 in which the suction fan 15 operates.

Connected with the suction fan housing 14 is the discharge pipe 16 which is controlled by the damper 17, the pipe 16 comprising means for discharging waste material into a suction bag or receptacle.

A damper 18 is mounted in the discharge pipe 19 and may be opened to discharge waste material to blow the same into that section of the field from which cotton has been picked. It will, of course, be understood that when a blast of air is directed through the pipe 19, the damper 17 will be closed.

The damper 20 located in the pipe 13 may be turned to control the passage of air from the body portion 11.

An additional air inlet 21 is provided in the funnel-shaped top 12, the opening being closed by means of the counterbalanced controlled damper 22.

Secured to the lower end of the body portion 11, at a point below the horizontal bars 5, are the vertical nozzle housings 23, which have their adjacent inner sides open so that the horizontal nozzle arms 24 during rotation, will swing through the open sides of the housings to direct blasts of air under pressure against the cotton plants within the space 25 between the nozzle housings 23, as the machine moves along a cotton row.

These nozzle arms 24 are arranged in vertical spaced relation with respect to each other, and are arranged in groups of four, although the number of arms may be varied to meet various requirements of use. The nozzle arms 24 have longitudinal bores 28, and radiate from the vertical hollow shafts 26 with which said bores communicate.

The nozzle arms 24 are formed with bores 28 disposed within the longitudinal centers thereof, the bores 28 communicating with the hollow shafts 26. Angular bores providing nozzles 29 are formed along the upper surfaces of the horizontal arms 24 and are arranged in spaced relation with each other so that air passing through the bores 28 and 29 will be directed upwardly into contact with the plants, in the form of fine streams with sufficient force to dislodge the cotton from the burrs.

Connected with the upper ends of the shafts 26, are flexible pipes 30 that extent to the compressor 31, which is operated by means of the internal combustion engine 32 mounted on the platform 33 secured at the upper part of the machine. The shaft 34 is operated by the internal combustion engine 32 operating the compressor and is supplied with the pulley 35 over which the belt 36 operates, the belt 36 also operating over the pulley 37 mounted on the horizontal shaft 38 that is of a length to extend between the funnel-shaped tops 12 of the body portion, where the shaft 38 supports the suction fans 15. Secured to the upper ends of the shaft 26, are pulleys 39 over which pulley bels 40 operate, the belts 40 also operating over the pulleys 41 secured to the upper ends of the shafts 42 that operate in bearings formed in the supporting arms 43 that are bolted to the machine. Secured to the lower ends of the shaft 42 are beveled pinions 44 that mesh with pinions 45 formed on the inner ends of the axles 8, whereby rotary movement is transmitted to the axles 8, and wheels 9, to propel the machine over the field.

The space between the vertical nozzle housings 23, is substantially closed by means of the swinging closures 45, the closures 45′ being of widths so that when they move to their closed positions, a space 46 is provided therebetween. These closures 45′ are also provided with notches extending inwardly from the free edges thereof, which notches permit the closures 45′ to swing past the rods 47 that have their forward ends turned downwardly and rearwardly, providing runners 48, the runners moving along the ground surface to pick up cotton limbs and lift them to positions where the air jets 8 from the nozzles may strike the cotton burrs to remove the cotton therefrom.

The closures 49 are mounted on spring hinges at the rear of the space between the vertical nozzle housings, and normally act to close the space, but swing open as the machine moves over the cotton plants.

Disposed directly under the nozzle arms 24, and substantially closing the space between the vertical nozzle housings, at the base thereof, are rubber sheets 50 that are secured to the bottoms of the vertical nozzle housings 23 and have their inner longitudinal edges spaced apart providing a clearance so that the machine may pass over the plants from which the cotton is being removed. These rubber sheets are so constructed that they will flex during the forward movement of the machine in such a way as to limit the amount of air leaking into and around the cotton stalks from the ground, thereby eliminating the possibility of suctioning great quantities of dust and ground trash, into the machine, with the cotton.

In order that the compressed air used in removing the cotton from the burrs will be conserved a valve 51 is shown as mounted on each arm 24, the valves being normally elevated to close the bores 28 and prevent the passage of air therethrough, the valves operating to open the bores at predetermined intervals, or when the arms swing into the space between the adjacent inner sides of the nozzle housings 23.

Each of the valves includes a stem 52 and a head 53 mounted thereon, there being provided a spring 54 mounted on the stem of each valve to normally urge the valve upwardly to its closed position, in which position the heads 53 of the valves extend above the upper surfaces of the arms 24. Secured within the housings 23 are the spacer cam arms 55 which have their free ends curved at 56, the curved ends 56 being so disposed that they lie in the path of travel of the heads 53 of the valve, as the nozzle arms rotate.

These cam arms are so located that the curved ends 56 will engage the valve heads 53 at a time when the horizontal nozzle arms 24 pass into the space 25, opening the valve at this time so that the air will pass from the nozzles to dislodge the cotton from the burrs, the valves close during the remaining movements of the arms within the nozzle housings 23.

The body portion, as shown by Fig. 3 of the drawings, is provided with chutes 57 which have their upper sides open so that the teeth 58 that radiate from the shaft 59 may operate at the mouths or open sides of the chutes, the shaft 58 being operated by means of the belts 60 that operate over pulleys 61, secured to the shaft 59, the belts 60 also operating over the pulleys 62 secured to the shaft 63 also operated from the shaft 34.

Extending horizontally through the center of the body portion 11, is the bar 64 to which the rods 65 are secured, the rods 65 having curved upper ends 66 that are curved around the free ends of the teeth 58, the ends of the rods 65 being secured to the bars 67, that extend longitudinally of the upper section of the body portion 11.

These rods 65 are spaced apart to such a degree that waste material drawn upwardly through the body portion will pass between the rods, while the cotton will be picked up by the teeth 58 and directed into the chutes 57. These chutes 57 communicate with the conveyor tube 68 which is provided with a screw conveyor 69 to direct the cotton to a place of collection or deposit.

This screw conveyor 69 includes the shaft 70 that extends through one end of the conveyor tube 68, where it is provided with the sprocket 71 over which the chain 72 operates, the chain 72 also operating over the sprocket 10 secured to the axle 8. Thus, it will be seen that rotary movement is transmitted from the axle 8 to the shaft 70 and screw conveyor 69.

In the form of the invention as shown by Figs. 8 and 9 of the drawings, the body portion which is indicated by the reference character 74 has an inclined upper end 75 over which the substantially cone-shaped head 76 is positioned, the cone-shaped head 76 being in communication with the body portion 74 so that the suction through the head 76 caused by the suction fan 77, will drawn cotton and waste material into the cone-shaped head 76.

In this form of the invention a supporting bar 78 is provided and mounted within the head 76, the bar 78 providing a support for the housing 79 in which the upper end of the shaft 80 is mounted, the upper end of the shaft 80 being provided with a pulley 81 over which the belt 82 operates, the belt transmitting movement to the pulley and shaft. Secured to the lower end of the shaft 80 is the member 83 which is pointed at 84 to split the blast of air when directed upwardly through the body portion 7, directing portions of the blast of air laterally. The member 83 is formed with a circular groove 80' in the upper surface thereof in which the wide lower ends 83' of the rods 85 are secured, as by means of the collar 85' which fits over the extensions 86'. The upper ends of the rods 85 are curved at 86, overlying the inner edge of the cone-shaped head 76 in spaced relation therewith, the intermediate portions of the rods being twisted at right angles to the curved ends 86 providing a substantially rigid screen rod construction. These curved ends 86 are of lengths to direct the cotton downwardly into the chutes 87, formed at the base of the head 76, while the waste material passes between the rods and is carried off through the pipe 88 by the fan 76.

Suction pipes 50 extend to a point adjacent to the ground surface and are provided with suction nozzles 51', whereby cotton which may have been knocked from the plants will be picked up for delivery through the machine.

While I have shown and described the use of air under pressure as the medium for removing or blowing the cotton from the burrs, it is to be understood that it is within the scope of this invention to use steam under pressure as a means for blowing the cotton from the burrs.

In the operation of the machine, the machine is moved along a row of cotton plants from which the cotton is being removed. As the nozzle arms 24 rotate, air or steam under pressure passing from the nozzles, as the arms swing into the space 25, strike the cotton and remove the cotton from the burrs.

Suction through the funnel-shaped top 12 will draw the cotton against the screening members or rods 65, separating the cotton from the waste material, the cotton passing laterally into the chutes 57, where it is forced on through the conveyor tube 68 and deposited for collection.

The waste material is discharged through the spouts 16 or 19.

Having thus described the invention, what is claimed is:

1. A cotton harvesting machine adapted to be moved over rows of cotton plants, comprising a frame, horizontally spaced vertical nozzle housings having closed bottoms and having open inner sides mounted on the frame providing a passageway between said housings for plants over which the machine is moved, rotatable vertical hollow shafts mounted within the nozzle housings, hollow horizontally disposed nozzle arms having discharge openings, radiating from said shafts communicating with said hollow shafts, vertically movable valves mounted at the inner ends of said arms controlling the passage of air under pressure through said nozzle arms and discharge openings, cams mounted within said housings adapted to engage the valves as said vertical shafts and arms rotate, operating said valves at predetermined intervals, said nozzle arms extending through the open sides of the nozzle housings directing blasts of air against plants over which the machine moves, said vertical shafts rotate, and means for rotating said vertical shafts.

2. A cotton harvesting machine adapted to be moved over rows of cotton plants, comprising a wheel supported frame, vertical nozzle housings mounted in the frame in horizontal spaced relation with respect to each other providing passageways between said housings, the adjacent inner sides of the nozzle housings being open, vertical hollow shafts mounted within said nozzle housings, horizontal nozzle arms secured to and radiating from said vertical hollow shafts, said nozzle arms having longitudinally disposed bores communicating with said hollow shafts, said arms also having bores in the upper surfaces thereof communicating with said longitudinally disposed bores, through which air is directed upwardly from said arms, said arms adapted to extend through the open sides of the nozzle housings as said shafts rotate, valves mounted in said arms, flexible air pipes connected with the vertical hollow shafts, through which air is directed to said arms, and means for operating the valves for intermittently controlling the passage of air through the bores of said arms.

3. A cotton harvesting machine adapted to be moved over rows of cotton plants, comprising a wheel supported frame, vertical nozzle housings mounted in the frame in horizontal transverse spaced relation with respect to each other, providing passageways between said housings, the adjacent inner sides of the nozzle housings being open, vertical hollow shafts mounted within said nozzle housings, horizontal nozzle arms radiating from said vertical shafts, said arms having longitudinally disposed bores communicating with said vertical hollow shafts terminating in discharge openings in the upper surfaces of said arms, valves operating in said bores adapted to control the intermittent flow of air under pressure through said bores, and discharge openings, and means for directing air under pressure to said bores.

4. A cotton harvesting machine comprising a frame, vertical nozzle housings supported by the frame in spaced relation with respect to each other and disposed transversely of said frame, said nozzle housings having inner open sides facing each other, spray members, each spray member embodying a rotatable vertical hollow shaft mounted within the nozzle housings, a plurality of hollow horizontally disposed nozzle arms radiating from said vertical shafts, communicating with said shafts, said nozzle arms operating through the sides of the nozzle housings as said vertical hollow shafts rotate, said arms having bores extending longitudinally therethrough terminating in upwardly directed bores providing nozzles through which air is forced, normally closed valves operating in said bores adapted to control the passage of air under pressure through said bores and nozzles, and a cam on said frame disposed in the path of travel of said valves opening said valves at predetermined intervals, as said nozzle arms rotate.

5. A cotton harvesting machine adapted to be moved over rows of cotton plants, comprising a frame, vertical nozzle housings on the frame said nozzle housings having closed bottoms and having open inner sides, said nozzle housings being spaced apart with their open inner sides opposite to each other providing a passageway, a plurality of hollow horizontal nozzle arms mounted in each nozzle housing, said nozzle arms extending through the open sides of the housing as said nozzle arms rotate, rows of bores in the nozzle arms providing nozzles, means for directing blasts of air into the rotary nozzle arms and nozzles, the blasts of air from the nozzles being directed to cotton plants over which the machine is moving, the blasts of air removing cotton from the plants.

References Cited in the file of this patent

UNITED STATES PATENTS

| Number | Name | Date |
| --- | --- | --- |
| 685,111 | Dannelly | Oct. 22, 1901 |
| Number | Name | Date |
| 858,371 | Corley | July 2, 1907 |
| 968,856 | Kinyon | Aug. 30, 1910 |
| 1,225,193 | Vittetoe | May 8, 1917 |
| 1,845,431 | Martin | Feb. 16, 1932 |
| 1,926,338 | Johnston | Sept. 12, 1933 |
| 2,489,963 | Henley | Nov. 29, 1949 |
| 2,493,564 | Arneson | Jan. 3, 1950 |